United States Patent [19]

Matou

[11] Patent Number: 5,478,595
[45] Date of Patent: Dec. 26, 1995

[54] METHOD AND APPARATUS FOR FORMING FILM ON SURFACE OF DISK

[76] Inventor: Kimitoshi Matou, 606-6, Higashino, Nagaizumi-cho, Sunto-gun, Shizuoka 411, Japan

[21] Appl. No.: 400,264

[22] Filed: Mar. 3, 1995

Related U.S. Application Data

[63] Continuation of Ser. No. 140,199, filed as PCT/JP93/00315, Mar. 17, 1993, abandoned.

[30] Foreign Application Priority Data

Mar. 18, 1992 [JP] Japan ................................ 4-062665

[51] Int. Cl.$^6$ ................................................ B05D 1/02
[52] U.S. Cl. ........................ 427/127; 427/424; 427/425; 118/52; 118/56; 118/300; 118/320
[58] Field of Search .............................. 427/127, 128, 427/130, 424, 425, 346; 118/52, 56, 314, 320, 323, 300

[56] References Cited

U.S. PATENT DOCUMENTS

| | | | |
|---|---|---|---|
| 4,284,033 | 8/1981 | del Rio | 118/730 |
| 4,353,937 | 10/1982 | Chiba et al. | 427/425 |
| 4,551,355 | 11/1985 | Ericson et al. | 427/128 |
| 4,564,280 | 1/1986 | Fukuda | 118/52 |
| 4,650,064 | 3/1987 | Slabaugh | 118/730 |
| 4,806,455 | 2/1989 | LaBianca | 427/425 |
| 4,951,604 | 8/1990 | Temple et al. | 118/730 |
| 5,079,043 | 1/1992 | Lambert | 427/425 |
| 5,094,884 | 3/1992 | Hillman et al. | 118/52 |

FOREIGN PATENT DOCUMENTS

| | | | |
|---|---|---|---|
| 59-139959 | 8/1984 | Japan . | |
| 421551 | 8/1984 | Japan . | |
| 88824 | 4/1988 | Japan | 118/320 |
| 261532 | 10/1988 | Japan . | |

*Primary Examiner*—Shrive Beck
*Assistant Examiner*—Brian K. Talbot
*Attorney, Agent, or Firm*—Sixbey Friedman Leedom & Ferguson

[57] ABSTRACT

A disk body (1) is arranged so that a portion of the coating forming surface thereof exists over a spray region A of a substantially circular cross-section made by a nozzle (10) for production of super fine particles to spray a coating forming agent, and the coating forming agent is sprayed while the disk body (1) is being rotated about the center thereof. The section near the peripheral edge of the disk body (1) passes through the section near the center of the spraying region where the density of fine particles is higher; however the passing speed thereof is fast, so the deposit efficiency of fine particles per unit area of the disk body (1) is lower, while the section near the center of the disk body (1) passes through the section near the peripheral edge of the spray region where the density of fine particles is lower; however, the passing speed thereof is slow, so the deposit efficiency of fine particles per unit area of the disk body is higher. This makes the amount of the fine particles which sticks to and accumulates on the disk body (1) uniform in the radial direction of the disk.

9 Claims, 12 Drawing Sheets

METHOD AND APPARATUS FOR FORMING FILM ON SURFACE OF DISK

This application is a continuation of Ser. No. 08/140,199, filed as PCT/JP93/00315, Mar. 17, 1993, now abandoned.

TECHNICAL FIELD

The present invention relates to a method and an apparatus for forming coatings on the surfaces of a disk, such as a floppy disk.

BACKGROUND ART

Figure 11:
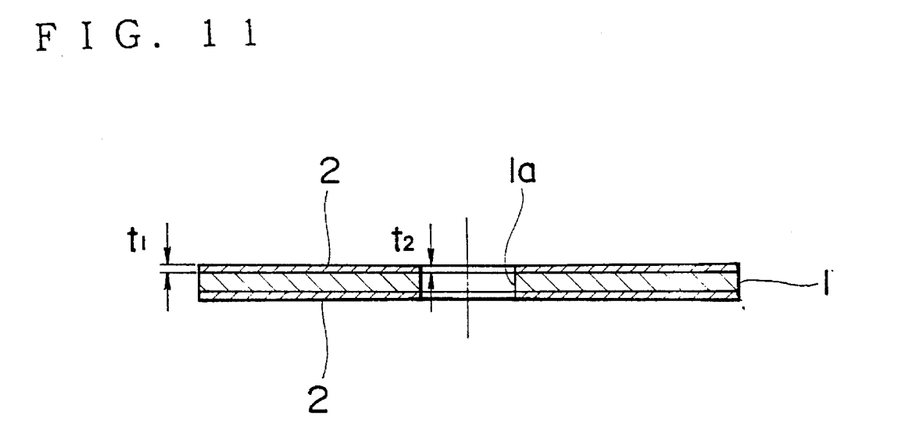
FIG. 11 is a sectional view of a conventional floppy disk.
Figure 12:
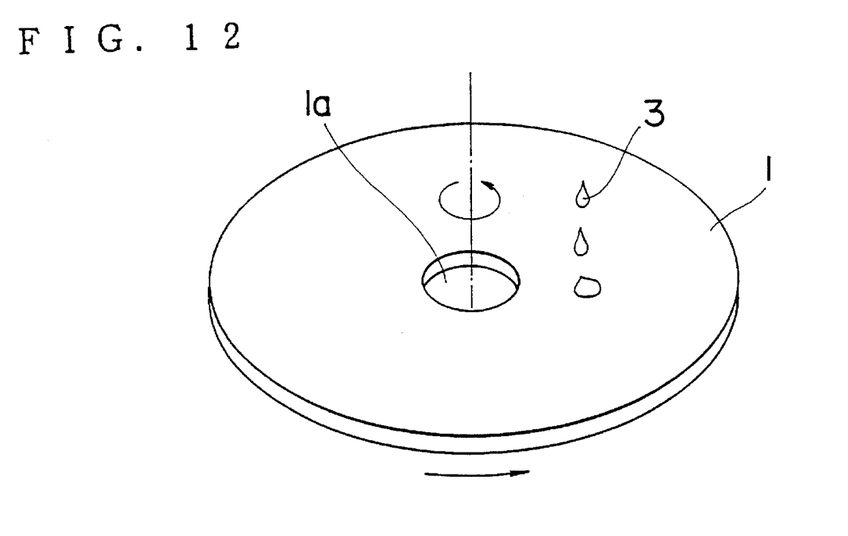
FIG. 12 is a view showing a conventional method for forming a coating of magnetic material on the surface of the floppy disk body.

On the two surfaces of the body 1 of a floppy disk are formed coatings or films 2 of magnetic material which are recording media of information, as shown in FIG. 11. Such films 2 are formed in such a manner that, as shown in FIG. 12, a mixed liquid 3 of magnetic material is dropped onto the disk body 1 rotating horizontally at a high speed, at a position near the central hole 1a thereof, and the mixed liquid 3 of magnetic material is radially extended on the surface of the disk body 1 by the action of the centrifugal force applied to the disk body 1, thereby forming the film of magnetic material on the entire surface of the disk body 1.

Preferably, the whole film 2 of magnetic material has a uniform thickness so as not to cause unevenness in recordable information. However, in the conventional method, since the film is formed by the action of a centrifugal force, there is a problem in that the film thickness is larger in the section near the peripheral edge of the disk ($t_1 > t_2$), and therefore, a uniform film can not be formed in the radial direction.

Hereupon, as a result of the research of the inventor of the present application, the following findings have been discovered.

Figure 13:
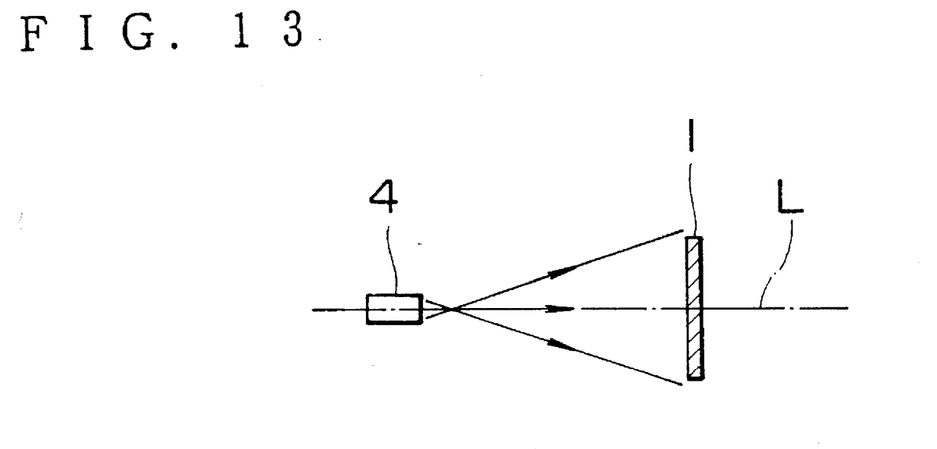
FIG. 13 is a view showing the state where the disk body is disposed in the spray region of the nozzle.
Figure 14:
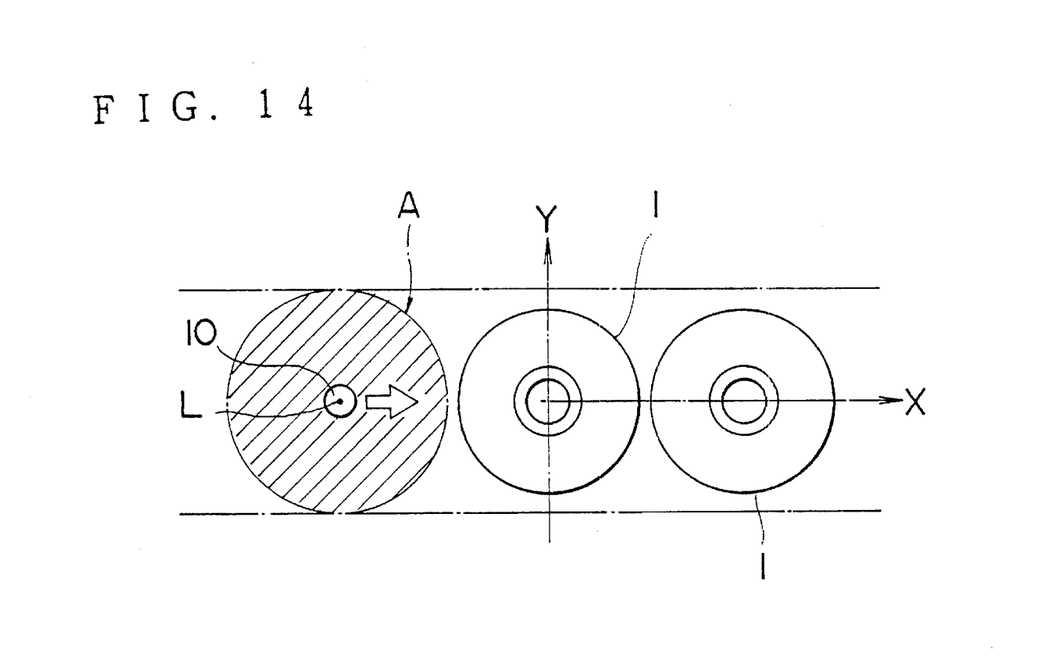
FIG. 14 is a view showing the case where the disk body or nozzle is moved straight.
Figure 15:
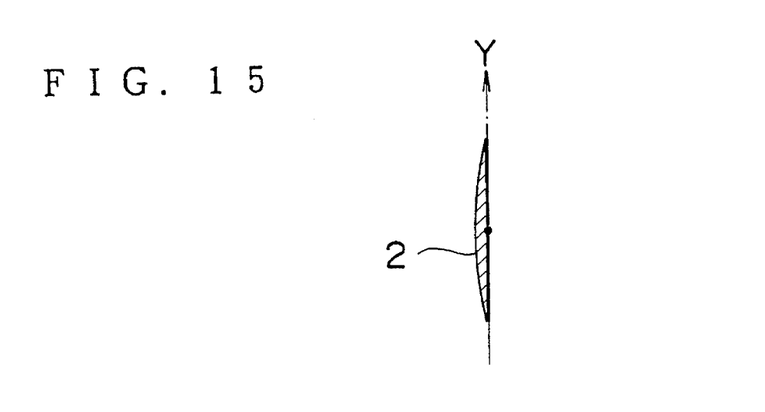
FIG. 15 is a view showing the change of the coating thickness in the direction of the Y axis of the coating produced in the case shown in FIG. 14.
Figure 16:
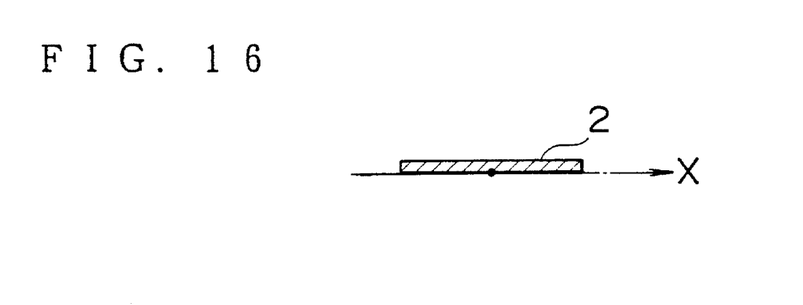
FIG. 16 is a view showing the change of the coating thickness in the direction of the X axis of the coating produced in the case shown in FIG. 14.

As shown in FIG. 13, when the mixed liquid of magnetic material is sprayed onto the surface of the disk body 1 in the form of super fine particles using a nozzle 4 for production of super fine particles, a film of magnetic material can be formed thereon. Then, as shown in FIG. 14, an attempt was made to arrange a plurality of disk bodies 1 in series, and at the same time, place the nozzle 4 opposite the disk bodies 1, and move the nozzle 4 or the disk bodies 1, thereby forming the film 2 continuously on the disk bodies 1. Reference A indicates the region of spray, and reference L the center of the nozzle. However, with the full cone type of nozzles up to now, the density of particles per unit area is thicker in the center portion of the nozzle and is thinner in the section near the peripheral edge of the disk. Accordingly, using the method shown in FIG. 14, it was found that the coating is uniform in thickness in the direction of the X axis (the moving direction of the nozzle or disk bodies), however it is not uniform in thickness in the direction of the Y axis (the direction intersecting at a right angle to the X axis).

Figure 17:
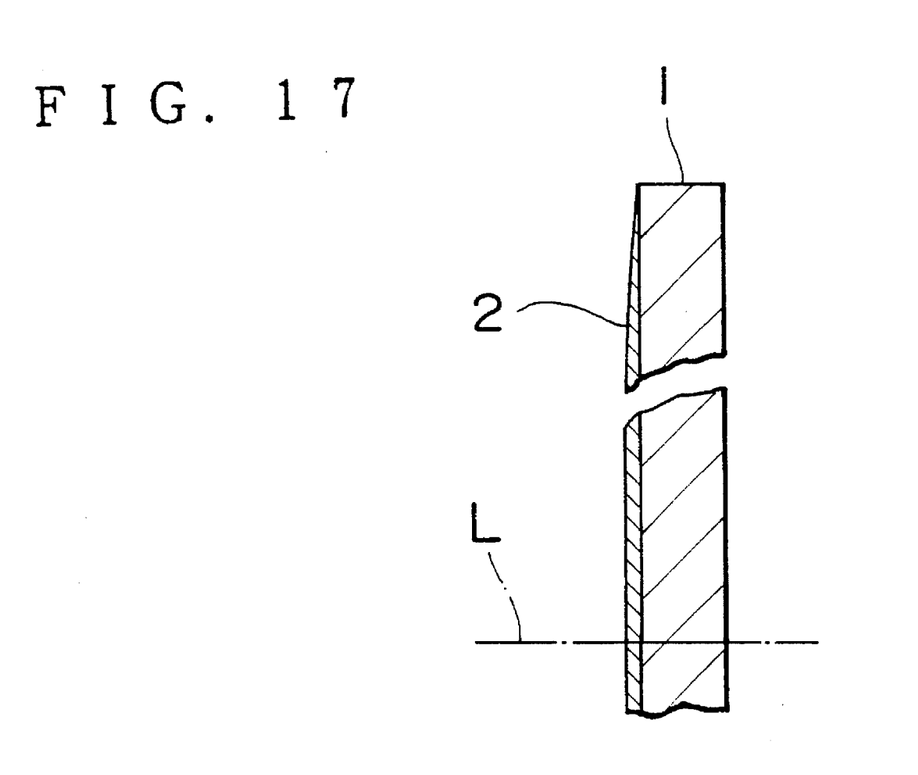
FIG. 17 is a view showing the thickness of the coating of magnetic material formed on the disk body in the condition shown in FIG. 13.
Figure 18:
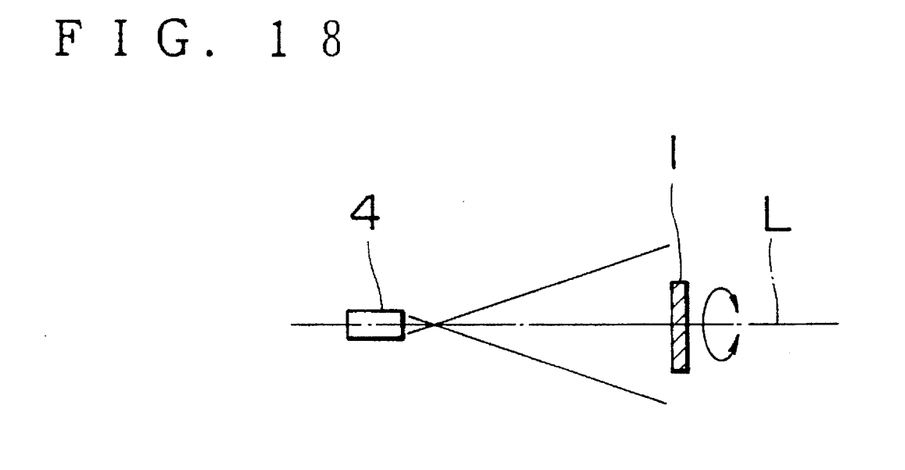
FIG. 18 is a view showing a state of rotating the disk body disposed near the center of the nozzle in the spray region of the nozzle.
Figure 19:
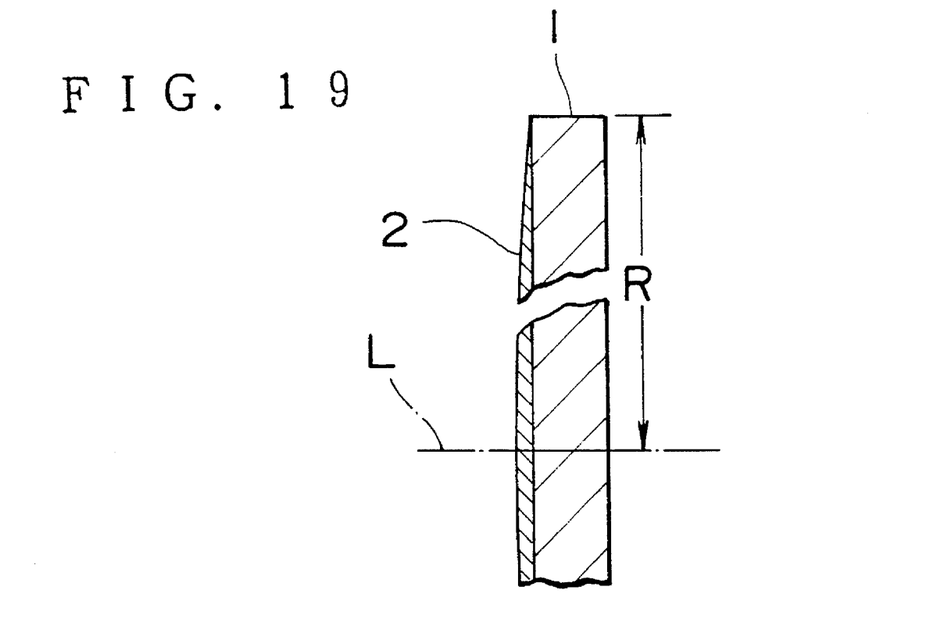
FIG. 19 is a view showing the thickness of the coating of magnetic material formed on the disk body in the condition shown in FIG. 18.

As a result of further research by the inventor, it was found, that with the method as shown in FIG. 13, the thickness of the film 2 formed on the surface of the disk body 1 is thicker in the section near the center portion of the nozzle and is thinner in the section near the peripheral edge of the disk, as shown in FIG. 17. Further, as shown in FIG. 18, an experiment was made by disposing the disk body 1 near the center L of the nozzle where the density of the sprayed particles is high and the distribution of the density of the particles is substantially uniform, and revolving the disk body 1 (not at a high speed, as shown in FIG. 12), and it was found that the film thickness is not uniform and is thinner in the section near the peripheral edge of the disk, as shown in FIG. 19. That is, the section near the peripheral edge of the revolving disk body 1 is greater in its peripheral speed ($V = R\omega^2$) than the section near the center, and therefore, is lower in deposit efficiency of the super fine particles of the mixed liquid of magnetic material per unit area of the disk body 1. On the contrary, the section near the center of the disk body 1 is slower in its peripheral speed than the section of the peripheral edge, and therefore, is higher in deposit efficiency of the super fine particles per unit area of the disk body 1. This shows the fact that the film thickness becomes increasingly thinner as the position proceeds from the center to the peripheral edge, as shown in FIG. 19.

Hereupon, the inventor found that if the disk body 1 is arranged so that, in the position near the center of the nozzle where the density of fine particles in the spray region A is higher, the peripheral speed of the disk body is fast, and therefore, the deposit efficiency of the fine particles on the disk body 1 becomes lower, while in the position away from the center of the nozzle where the density of fine particles is lower, the peripheral speed of the disk body is slow, and therefore, the deposit efficiency of the fine particles on the disk body becomes higher, a uniform film thickness is obtained on the entire disk body. Based on the above-mentioned point of view, he has come to achieve the present invention.

The present invention has been made in light of the above-mentioned problems in the prior art, and the object of the invention is to provide a method and an apparatus for forming coatings on the surfaces of the disk, which enable a coating with uniform film thickness to be formed on the entire coating forming surface of the disk.

DISCLOSURE OF INVENTION

In order to achieve the above-mentioned object, a method for forming coatings on the surfaces of a disk according to claim 1 comprises arranging a disk so that a portion of the coating forming surface of the disk exists over the spray region having a substantially circular cross-section made by a nozzle for production of super fine particles, and spraying a coating forming agent onto the disk while the disk is being rotated about the center thereof.

Further, in claim 2, a plurality of disk bodies are arranged along the peripheral edge of the spray region according to the method for forming coatings on the surfaces of the disk as described in claim 1.

In the method for forming coatings on the surfaces of a disk as described in claim 3, the disk body is arranged so that a portion of the coating forming surface is located in the spray region of a substantially circular cross-section made by the nozzle for production of super fine particles to spray a coating forming agent, and the coating forming agent is sprayed while the nozzle is being rotated about the disk body.

An apparatus for forming coatings on the surfaces of the disk according to claim 4 comprises a nozzle for production of super fine particles to spray a coating forming agent; a disk body arranged so that a portion of the coating forming surface thereof exists over the spray region of a substantially circular cross-section made by the nozzle; and a rotating means for rotating the disk about the center thereof.

Moreover, in claim 5, a plurality of disk bodies are arranged along the peripheral edge of the spray region as described in claim 4.

Further, an apparatus for forming coatings on the surfaces of the disk as described in claim 6 comprises a group of the disk bodies arranged in series in the form of a staggered lattice; a rotating means for rotating individual disk bodies; and a nozzle for production of super fine particles to spray a coating forming agent on the coating forming surface of the disk body.

In claim 7, the disk bodies are arranged close to each other so that at least one disk body is positioned in the spray region of the nozzle in the apparatus for forming coatings on the surfaces of the disk as described in claim 6.

Furthermore, an apparatus for forming coatings on the surfaces of the disks as described in claim 8 comprises a group of disk bodies arranged in series in the form of a staggered lattice; a rotating means for rotating individual disk bodies; a travelling means for moving the group of disk bodies straight in the direction of arrangement thereof; and a nozzle for production of super fine particles to spray a coating forming agent onto the coating forming surface of the disk bodies and disposed toward the disk bodies opposite the middle of the width transverse to the direction of arrangement of the group of the disk bodies.

With the method and apparatus according to the invention as described above, the section of the peripheral edge of the disk body passes through the section of the center of the spray region where the density of fine particles is higher; however, it is fast in its passing speed and therefore, is lower in deposit efficiency of fine particles per unit area of the disk body, while the section near the center of the disk body passes through the section of the peripheral edge of the spray region where the density of fine particles is lower; however, it is slow in its passing speed, and therefore, is higher in deposit efficiency of fine particles per unit area of the disk body. This makes the amount of fine particles which sticks to and accumulates on the disk body uniform in the radial direction of the disk body.

BEST MODE FOR CARRYING OUT THE INVENTION

Now, embodiments of the invention will be explained on the basis of the drawings.

Figure 1:
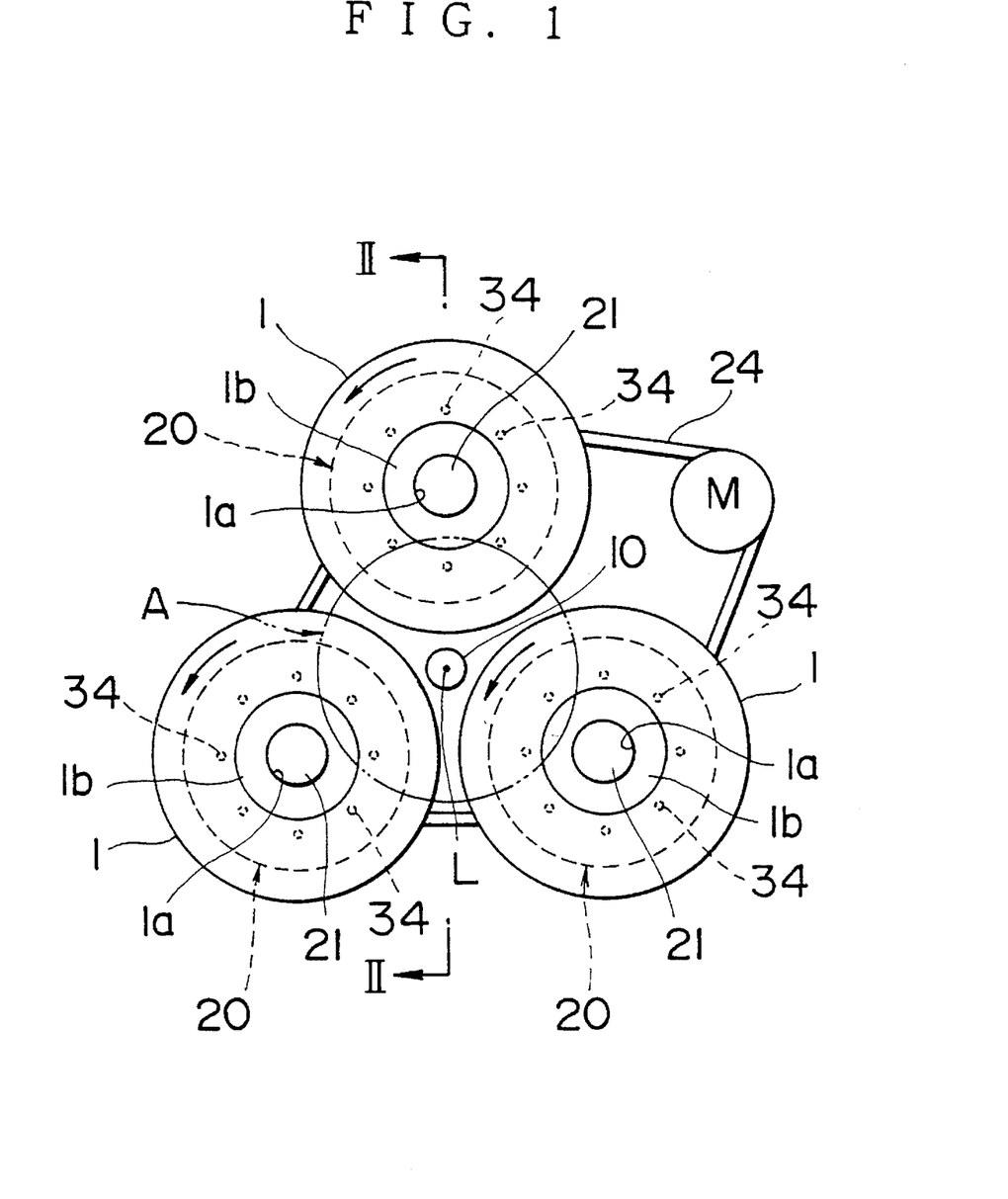
FIG. 1 is a front view showing the entire construction of an apparatus for forming coatings of magnetic material which is a first embodiment of the invention.
Figure 2:
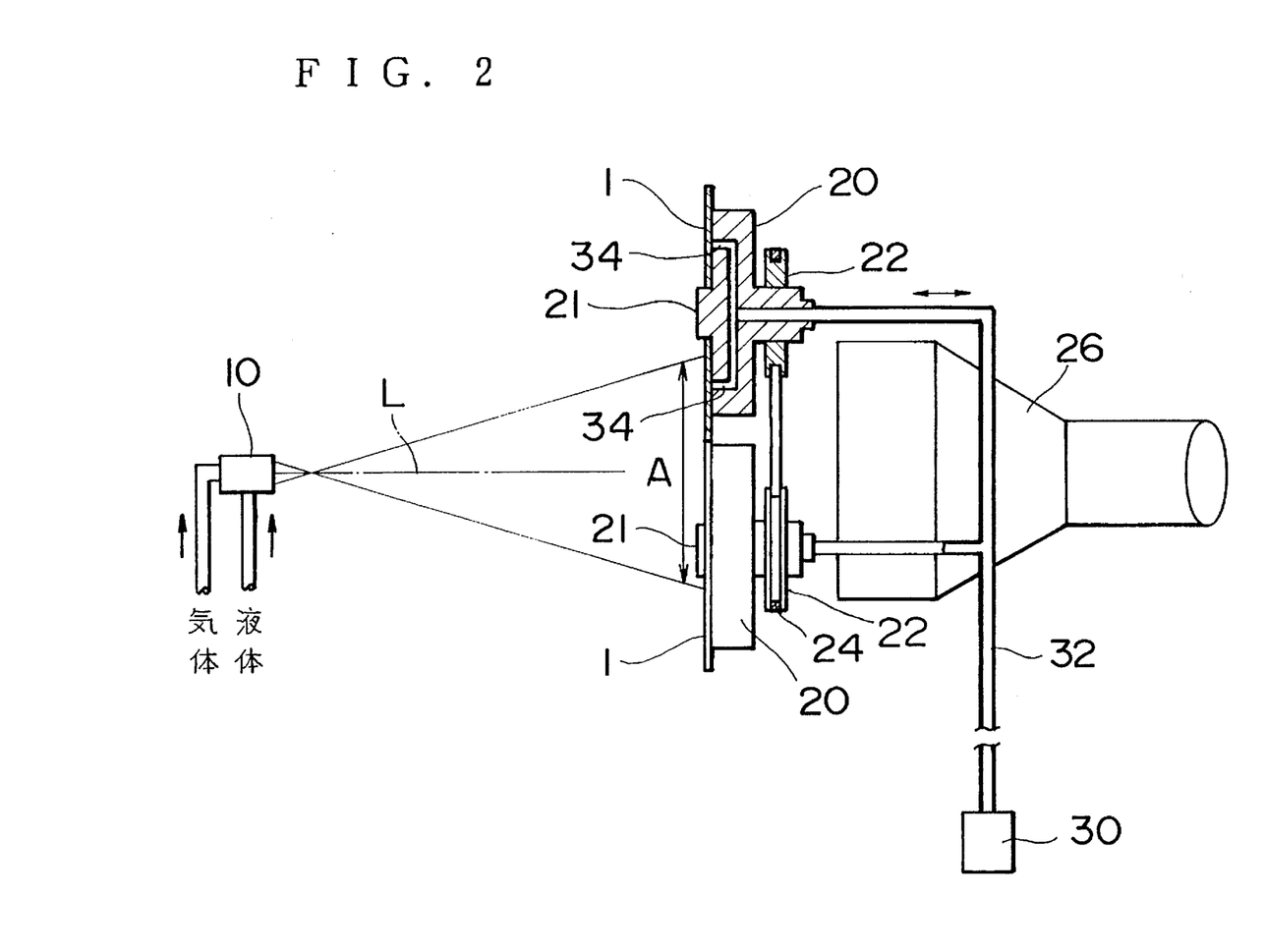
FIG. 2 is a sectional view of the same apparatus (a sectional view taken along line II—II shown in FIG. 1)

FIGS. 1 and 2 show an embodiment in which the invention is applied to form coatings of magnetic material. FIG. 1 is a front view showing the entire construction of an apparatus for forming coatings of magnetic material and FIG. 2 is a longitudinal sectional view of the same apparatus (a sectional view taken along line II—II shown in FIG. 1).

Referring to these drawings, reference numeral 10 indicates a nozzle for production of super fine particles, which is provided in the center thereof with a liquid spraying port extending horizontally and having an annular gas ejection port formed around the liquid spraying opening. A vortex flow of air turning at a high speed and formed in a vortex flow chamber is introduced into the gas ejection port, and a high speed vortex flow in the form of a cone, tapering forward, is ejected from the gas ejection port, and the liquid (mixed liquid of magnetic material), which is sucked in under a negative pressure due to the high speed vortex flow and spouted out of the liquid spray port, is brought into contact with the high speed vortex flow at the front so that the liquid is broken down into super fine particles (the spraying condition). The nozzle 10 is described in detail in U.S. Pat. No. 1,730,868 (Patent publication Sho-4-215515) of the application filed by and patented to the same applicant, and the outline of only the construction of the nozzle will be given here.

Figure 3:
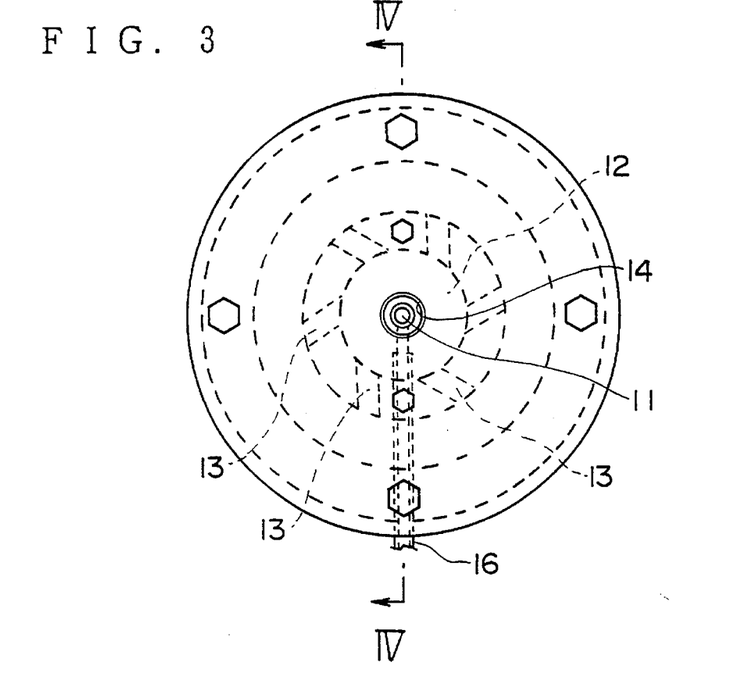
FIG. 3 is a front view of a nozzle for production of super fine particles.
Figure 4:
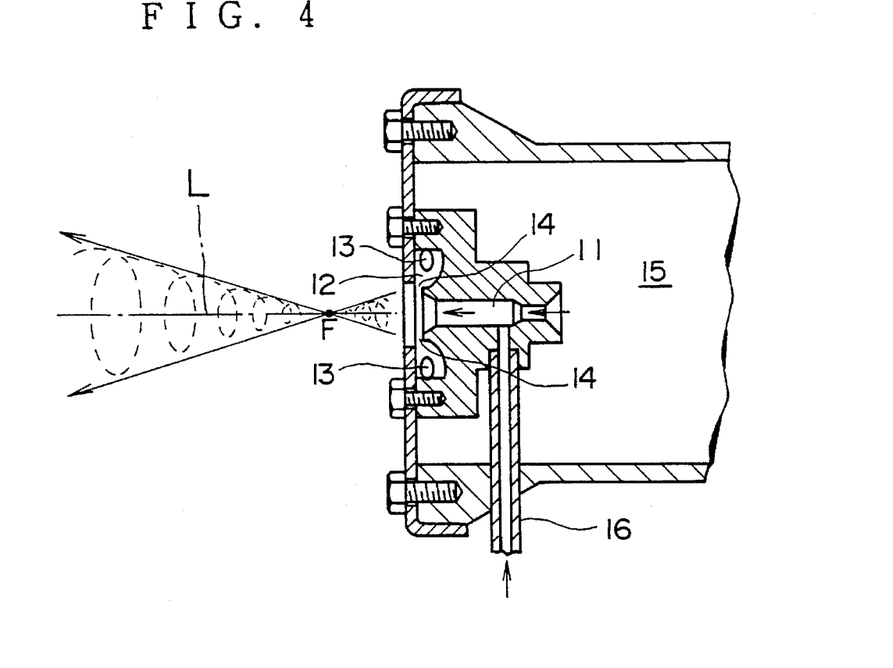
FIG. 4 is a longitudinal sectional view of the nozzle (a sectional view taken along line IV—IV shown in FIG. 3)

As shown in FIGS. 3 and 4, this nozzle 10 comprises a liquid spraying port 11, which communicates with a high pressure chamber 15 and a liquid supply pipe 16 and from which the liquid (mixed liquid of magnetic material) of an object to be atomized is ejected; an annular vortex flow chamber 12 formed at the position where the liquid spraying port 11 is enclosed; a plurality of turning guide holes 13 which extend spirally from the high pressure air chamber 15 and which introduce a high speed flow of gas into the vortex flow chamber 12 to cause a high speed turning flow in the vortex flow chamber 12; and an annular gas ejection port 14 which opens directed to the front of the liquid spraying port 11 at the side of the vortex flow chamber 12 facing the liquid spraying port 11 and which sprays a high speed vortex flow in the form of a tapered cone having a focus F in front of the liquid spraying port 11. The high speed turning flow rectified by the vortex flow chamber 12 is ejected in the form of a tapered cone from the annular gas ejection port 14 toward the front of the liquid spraying port 11, flowing in a uniform high speed vortex flow. With such a tapered cone, as soon as the liquid (mixed liquid of magnetic material) is ejected from the liquid ejection port 11, it comes into contact with the high speed turning vortex flow at the front outside the nozzle, thereby being broken into small particles and diffused into a mist (super fine particles).

In the spray region A (shown by the hatching in FIG. 1) of a substantially circular cross-section at the front of the nozzle 10 disposed horizontally are arranged three disk adsorbing holders 20 along the peripheral edge portions of the spray region A. On the front surface of each of the holders 20 is formed a projection 21 engageable with a center hole 1a of the disk body 1 and a plurality of suction holes 34 communicating with pipings 32 extending from a negative pressure generating means 30. Each disk body 1 with the center hole 1a engaged by the projection 21 is adsorbed to and held on the front surface of the holder 20 by a negative pressure acting on the suction holes 34. At the back surface sides of the holders 20 are provided wheels 22 which are connected by a timing belt 24 and each holder 20 is rotated at a predetermined speed in a synchronized manner by the drive of a motor M. Behind the holder 20 is provided a duct 26 for adsorbing and collecting the super fine particles of the mixed liquid of magnetic material, among the super fine particles sprayed by the nozzle 10, which have not stuck to the disk body 1.

The disk bodies 1 adsorbed and held on the front surface of the holders 20 are arranged so that ¼ of the region of each disk body 1 is positioned within the spraying region A of the nozzle 10. Each disk body 1 is rotated integrally with the holder 20, and as the disk body 1 passes through the spraying region A of the nozzle 10, the super fine particles of the mixed liquid of magnetic material stick and accumulate on the surface of the disk body 1, and the rotation of the disk body 1 allows the coating of magnetic material to be formed on the entire surface of the disk body 1. Reference 1b indicates the doughnut-like region where a coating is not formed and which is provided about the peripheral edge of the center hole 1a of the disk.

Figure 5:
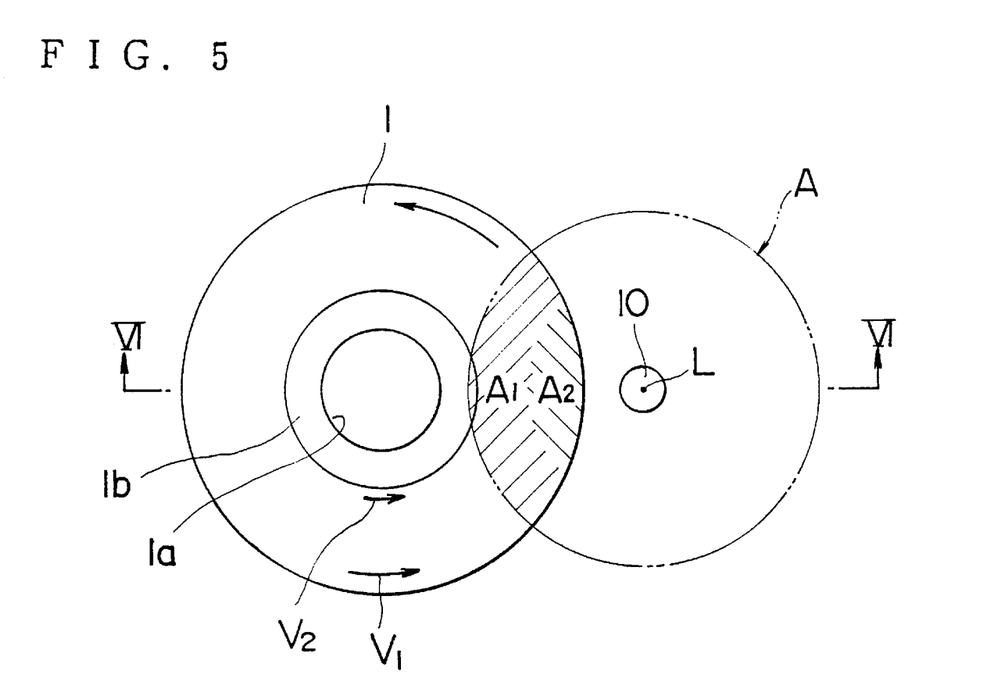
FIG. 5 is a view showing a relation between the disk body and the spray region of the nozzle.
Figure 6:
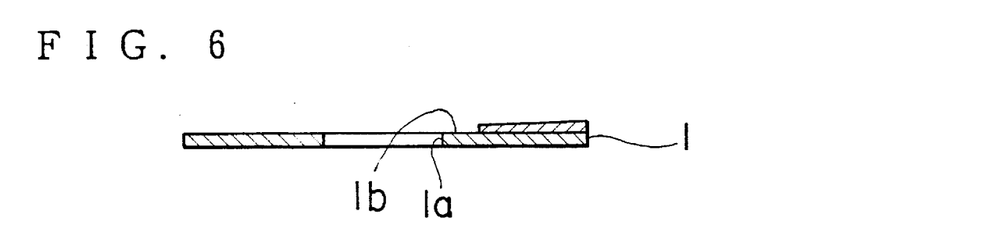
FIG. 6 is a view showing the thickness of the coating formed in the case where the disk body is not rotated in FIG. 5.
Figure 7:
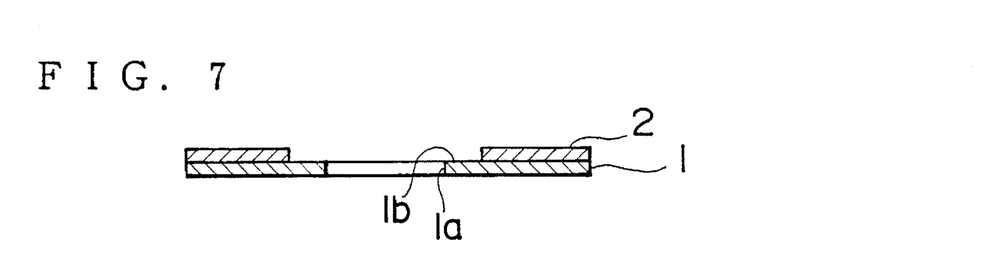
FIG. 7 is a view showing the thickness of the coating formed in the case where the disk body is rotated in FIG. 5.

That is, in the spray region A, the farther the sprayed point is away from the center L of the nozzle (in the portion approaching the peripheral edge portion of the spray region A), the lower the density of the super fine particles of the mixed liquid of magnetic material is, and, therefore, the density of super fine particles is lower in the section near the center of the disk body 1 and higher in the section near the peripheral edge of the disk body 1. For this reason, in the case where the disk body 1 is not rotated, the thickness of the coating 2 of magnetic material formed on the disk body 1 is thicker in the section near the peripheral edge of the disk and thinner in the section near the center thereof, as shown in FIG. 6. However, the disk body is being rotated, and therefore, in the region $A_1$ (refer to FIG. 5) near the peripheral edge of the spray region A, where the density of particles is lower, the disk body 1 is slow in the peripheral speed V ($=V_2$, $V_2<V_1$) thereof and, therefore, higher in the deposit efficiency of super fine particles. On the other hand, in the region $A_2$ (refer to FIG. 5) near the center of the nozzle in the spray region A, the disk body 1 is fast in the peripheral speed V ($=V_1$, $V_1<V_2$) thereof, and therefore, lower in the deposit efficiency of super fine particles. For this reason, the coating 2 of magnetic material having a thickness uniform in the radial direction is formed on the entire surface of the disk body, as shown in FIG. 7.

In the above-mentioned embodiment, a plurality of disk bodies 1 are arranged in the spray region A of the nozzle 10 for production of super fine particles, and the coatings 2 of magnetic material are simultaneously formed on the surfaces of the plurality of disk bodies 1; however one disk body 1 may be disposed in the spraying region A.

Figure 8:
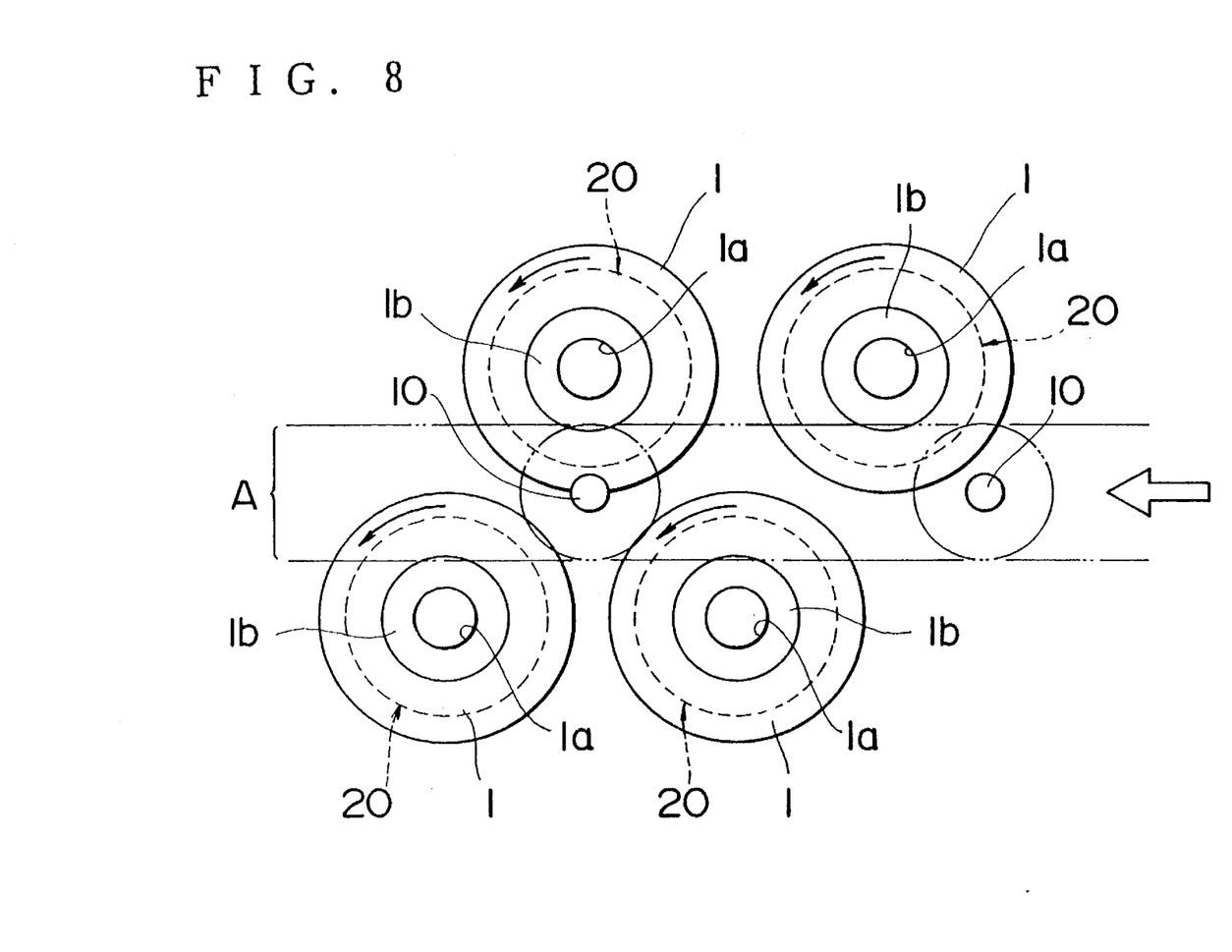
FIG. 8 is a front view showing the entire construction of an apparatus for forming coatings of magnetic material which is a second embodiment of the invention.

FIG. 8 is a front view showing the entire construction of an apparatus for forming coatings of magnetic material, which is a second embodiment of the invention (embodiment corresponding to claim 6), and it is so constituted that the nozzles are moved straight with respect to the rotating disk bodies.

In this embodiment, a number of the disk adsorbing holders 20 are arranged in the form of a staggered lattice in series. A plurality of the nozzles 10 for production of super fine particles are disposed opposite the holders 20 and parallel to the direction of arrangement of the holders at predetermined distances. Further, the group of these nozzles is moved in the direction of arrangement of the holders 20 (to the left in FIG. 8) at a constant speed, which is slower than the rotational speed of the disk bodies 1, and on the surfaces of the disk bodies 1 which have passed through the spray regions of the nozzles 10, the coatings of magnetic material (the coatings of uniform thickness) are formed every time the spray region of each nozzle passes the disk bodies. That is, the coatings can be applied to the surfaces of the disk bodies while being superimposed a few times.

If the kinds of the liquids sprayed from the nozzle are made different, it is possible to form a plurality of different kinds of coatings on the surfaces of the disk bodies. For example, a mode of use may be considered in which a coating of magnetic material is formed by a first nozzle and a protective coating is formed on the coating of magnetic material by a second nozzle.

Figure 9:
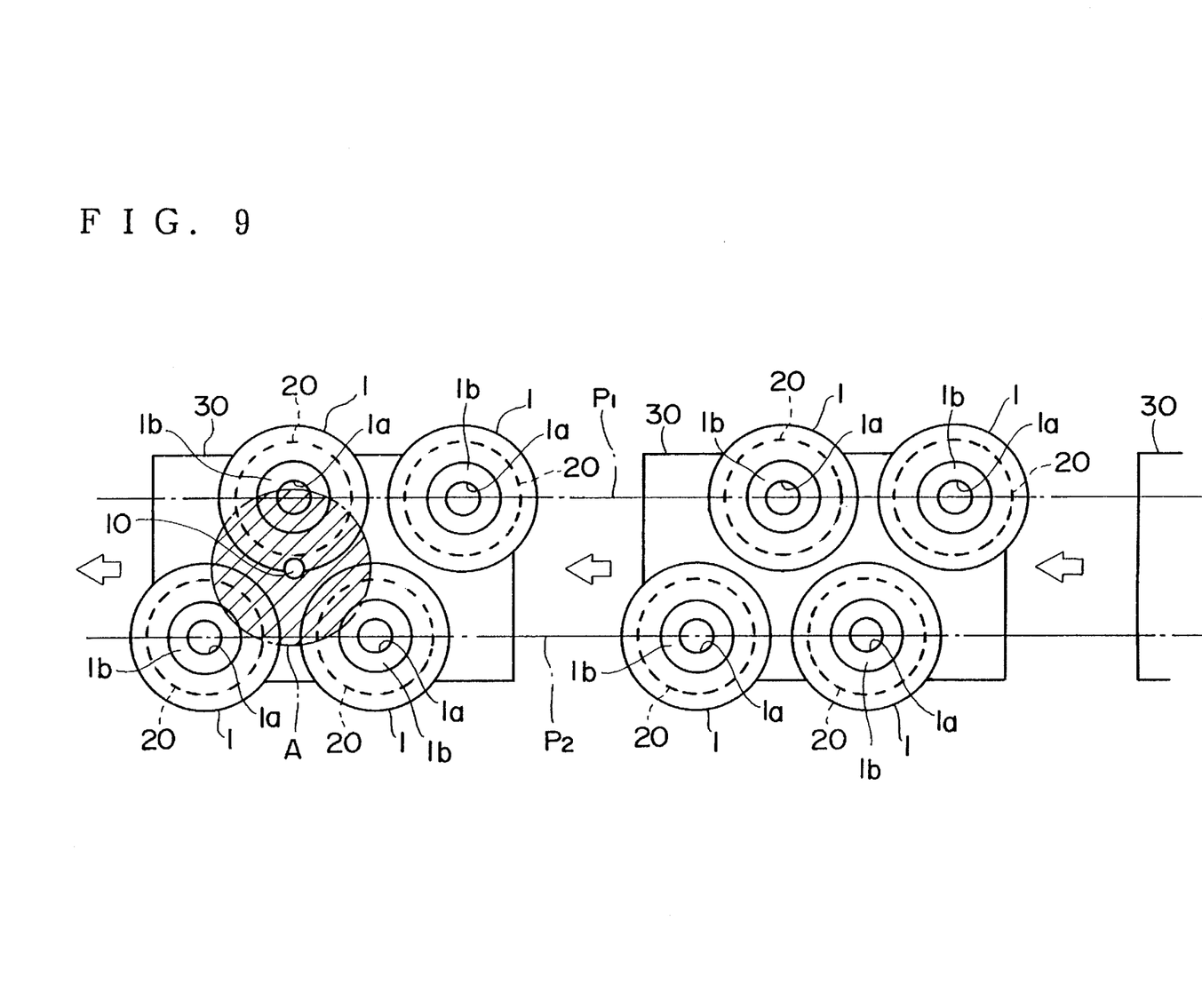
FIG. 9 is a plan view of an apparatus for forming coatings of magnetic material, which is a third embodiment of the invention.

FIG. 9 is a plan view showing the entire construction of an apparatus for forming coatings of magnetic material which is a third embodiment of the invention (embodiment corresponding to claim 8).

In the first and second embodiments as described above, the nozzles 10 are disposed horizontally, while in the present embodiment, the nozzles 10 are arranged directed downward so as to form a spray region below themselves. Moreover, in the above-mentioned second embodiment, arrangement of the group of the disk bodies is fixed and the nozzles 10 are moved straight relative to the group of the disk bodies, however, the present embodiment has a feature in that the group of the disk bodies is moved relative to the fixed nozzles 10.

That is, in this embodiment, on a plurality of sliders 30, 30 conveyed at equal distances kept therebetween by an adequate conveying means such as a slide means using a ball screw or a travelling means using a chain, are arranged four disk adsorbing holders 20 each supporting a disk body 1, in a staggered lattice manner. Within each of the sliders 30 is provided a rotation drive means for rotating each holder 20 (the drive means comprising a motor, a belt and wheels, similar to the first embodiment), which rotates the disk body 1 adsorbed to and held on each holder 20 at a constant speed. A nozzle 10 is disposed directed downwards in a position right over the center of the width transverse in the direction of the travelling way for the sliders 30 (position right over the center between the lines $P_1$ and $P_2$ of the disk bodies 1 arranged in series). Reference A indicates the spray region of the nozzle 10. When the sliders 30 are moved in the direction of the arrows in FIG. 9 at a constant speed with the holders 20 being rotated, each disk body 1, while being rotated, passes through the spray region A of the nozzle 10, so that the coating of magnetic material (the coating being uniform in thickness over the entire surface of the disk body) is formed on each disk body 1.

In this way, since the coatings of magnetic material can be continuously formed on a number of disks in the present embodiment, it is particularly convenient for the case of mass production.

Figure 10:
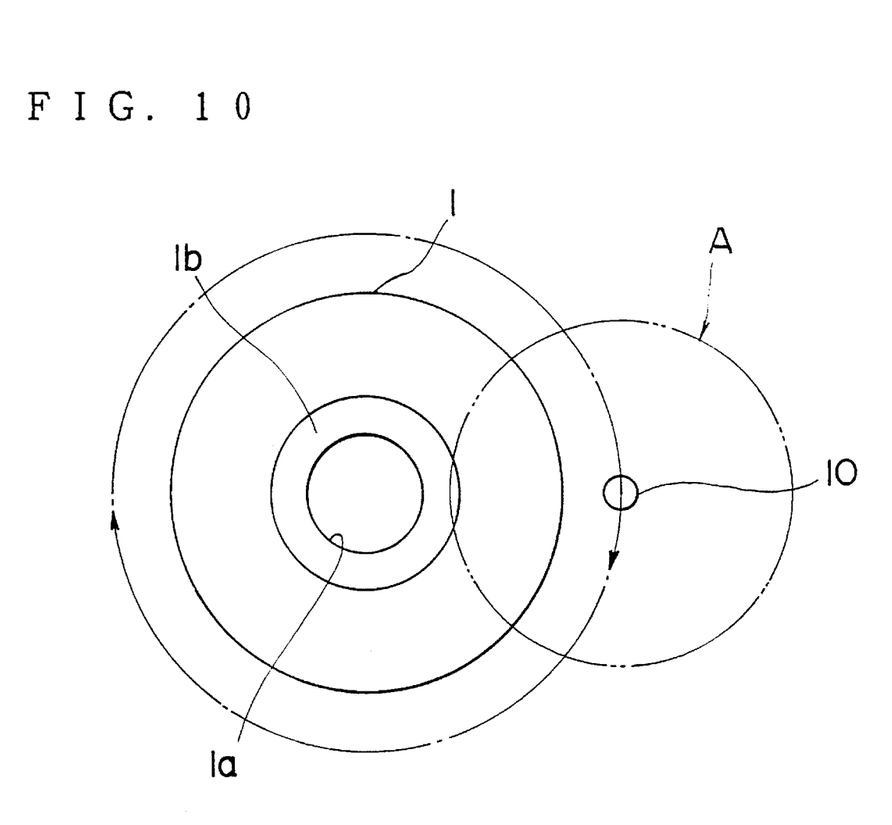
FIG. 10 is a front view of an apparatus for forming coatings of magnetic material, which is a fourth embodiment of the invention.

FIG. 10 shows an apparatus for forming a coating of magnetic material which is another embodiment of the invention (embodiment corresponding to claim 3), wherein the nozzle 10 is moved along the periphery of the disk body 1 held fixedly, thereby forming a coating uniform in thickness (coating of magnetic material) on the entire surface of the disk body 1.

In the various kinds of embodiments as described above, explanations are made taking the case where the mixed liquid of magnetic material is sprayed using the nozzle for production of super fine particles the right of which was previously proposed and already acquired by the same applicant, however, as the nozzle 10, a vortex flow type nozzle for production of super fine particles (U.S. Pat. No. 1,730,868) as described above does not have to be used, but other nozzles for production of fine particles may be used.

Further, in the above-mentioned embodiments, explanations of the method and apparatus according to the invention are made taking the forming of the coating of magnetic material; however the coating formed on the disk body 1 is not limited to the coating of magnetic material, but any kind of coating can be used if it consists of materials which can be sprayed in the form of super fine particles by the spraying nozzle to stick to the disk body and form the coating thereon. For example, the present invention may be applied to the case where a protective coating is formed on the coating of magnetic material.

INDUSTRIAL APPLICABILITY

As apparent from the above-mentioned explanation, according to the method for forming coatings on the surfaces of the disk in claims 1 and 3 or the apparatus for forming coatings on the surfaces of the disk in claim 4, the section near the peripheral edge of the disk body passes through the section near the center of the spray region where the density of fine particles is higher; however, the passing speed thereof is fast, and therefore, the deposit efficiency of fine particles per unit area of the disk body is lower, while the section near the center of the disk body passes through the section near the peripheral edge of the spray region where the density of fine particles is lower; however the passing speed is slow, and therefore, the deposit efficiency of fine particles per unit area of the disk body is higher. This makes the amount of fine particles which sticks to and accumulates on the disk body uniform in the radial direction of the disk, and such a uniform coating can be formed on the disk body in a short period of time.

Further, the apparatus according to claims 2 and 5 enables the coatings uniform in thickness to be formed on a plurality of disks in a short time, so that a better efficiency of production may be achieved.

Moreover, the apparatus according to claims 6 and 8 allows the coatings uniform in thickness to be formed on a number of disks, so that it is superior for mass treatment and achieves a remarkable increase in the efficiency of production.

Further, in the apparatus according to claim 7, the adjacent disk bodies are arranged close to each other so that a coating forming agent is effectively used for the forming of the coating.

I claim:

1. A method for forming a uniform coating of a sprayable coating agent on a flat surface of a peripheral portion of a disc body along the radius thereof by means of a spray nozzle means for spraying particles of said coating agent in a generally circular pattern, wherein the radius of the spray pattern is equal to or greater than the radial extent of the peripheral portion of the disc body to be coated, and the density of the particles along the radius of the pattern is greater toward the center of the pattern and lesser toward the edge of the pattern, comprising the steps of:

positioning said nozzle means so that one side of the circular spray pattern completely overlaps the radial extent of said peripheral portion of the disc, with the center of said circular spray pattern being directed toward the periphery of the disc body and the edge of said pattern being directed toward the center of the disc body while the other side of the circular spray pattern does not overlap said disc body, and actuating said spray means while rotating said disc body at a speed sufficient to create a difference in the deposit efficiency of the spray particles along the radius of the disc body that complements the radial difference in the density of the spray particles in the circular spray pattern such that said spray particles are uniformly deposited along the radius of the disc body.

2. The method for forming a uniform coating defined in claim 1, wherein said nozzle means is positioned so that the center of said circular spray pattern is directed toward the periphery of a plurality of adjacent disc bodies while the edge of said pattern is directed toward the center of said plurality of disc bodies.

3. The method for forming a uniform coating defined in claim 1, wherein said nozzle means is stationarily positioned with respect to the disc body while said spray means is actuated.

4. The method for forming a uniform coating defined in claim 2, wherein said nozzle means is movably positioned at a constant speed with respect to said plurality of disc bodies while said spray means is actuated.

5. An apparatus for forming a uniform coating of a sprayable coating agent on a flat surface of a peripheral portion of a disc body along the radius thereof, comprising:

a spray nozzle means for spraying particles of said coating agent in a generally circular pattern wherein the radius of the spray pattern is equal to or greater than the extent of the peripheral portion of the disc body to be coated, and the density of the particles along the radius of the pattern is greater toward the center of the pattern and lesser toward the edge of the pattern;

means for positioning said nozzle means so that one side of the circular spray pattern completely overlaps the radial extent of said peripheral portion of the disc with the center of the circular spray pattern contacting the periphery of the disc body and the edge of the pattern contacting the center of the disc body while the other side of the spray pattern does not overlap said disc body, and means for rotating said disc body at a speed sufficient to create a difference in the deposit efficiency of the spray particles that complements the radial difference in the density of the spray pattern such that said spray particles are uniformly deposited along the radius of the disc body.

6. The apparatus for forming a uniform coating defined in claim 5, wherein said positioning means stationarily positions said nozzle means with respect to said disc body while said nozzle means sprays said disc body.

7. The apparatus for forming a uniform coating defined in claim 5, further comprising means for rotating a plurality of adjacently arranged disc bodies simultaneously and wherein said positioning means positions said nozzle means so that the center of the circular spray pattern contacts the periphery of each of the disc bodies while the edge of said pattern contacts the center of each of the disc bodies.

8. The apparatus for forming a uniform coating defined in claim 7, wherein said disc bodies are arranged in an offset pattern along an axis, and further comprising means for moving said nozzle means along said axis at a constant speed with respect to said disc bodies.

9. The apparatus for forming a uniform coating defined in claim 8, further comprising a plurality of axially spaced apart nozzle means for applying said uniform coating on said disc bodies.

* * * * *